T. J. FORD.
Sewing Machine.

No. 228,992.  Patented June 22, 1880.

Witnesses:
Thos. S. Minnich,
H. M. Richmond.

Inventor:
Thomas J. Ford.
by his atty,
A. B. Richmond.

UNITED STATES PATENT OFFICE.

THOMAS J. FORD, OF HARMONSBURG, PENNSYLVANIA.

SEWING-MACHINE.

SPECIFICATION forming part of Letters Patent No. 228,992, dated June 22, 1880.

Application filed April 7, 1880. (Model.)

*To all whom it may concern:*

Be it known that I, THOMAS J. FORD, of Harmonsburg, county of Crawford, State of Pennsylvania, have invented a new Improvement on Sewing-Machines, of which the following is a specification.

My invention is for the purpose of controlling the motion of the needle-bar of sewing-machines in such a manner that the motion of the needle may be stopped instantly, while the drive-wheel and treadle may continue in motion, and at the same time to prevent the machine from being run backward.

Figure 1:
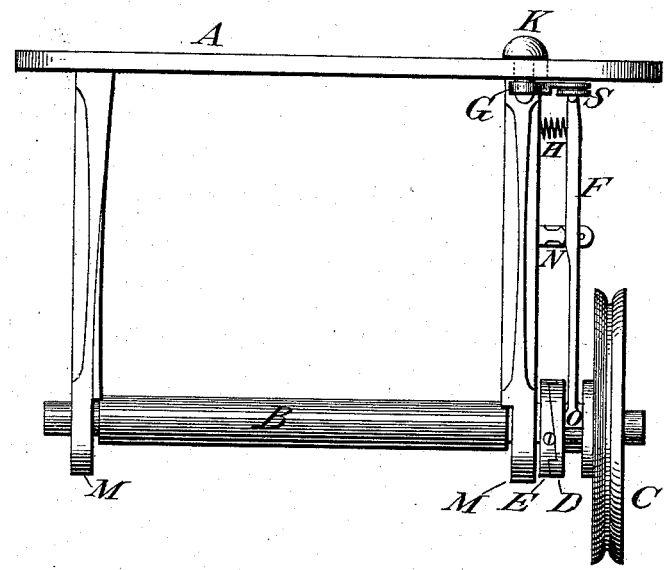
Figure 2:
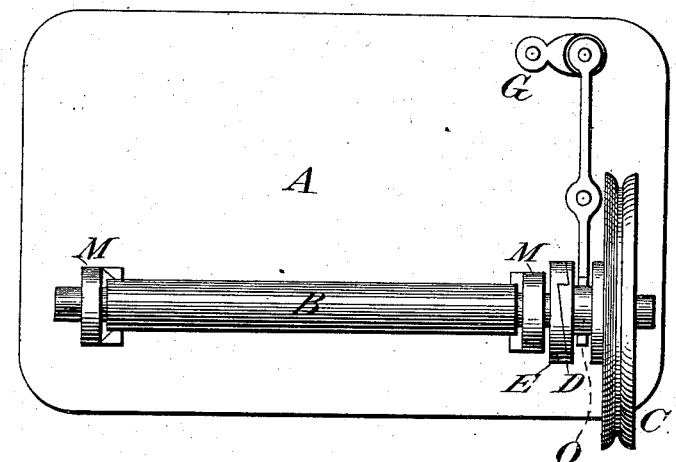

Figure 1 is a side view of my invention. Fig. 2 is a view of the under side of the table of the machine with my invention attached thereto.

B represents the eccentric-shaft, which moves the needle-bar and the shuttle-bar in shuttle-machines. C is the band-pulley, driven by a band from the band-wheel. (Not shown in the drawings.)

The pulley C is loose on the shaft B, and on the inside of the pulley C is a clutch, D, attached to it, also loose on the shaft B, and revolving with the pulley C.

E is a corresponding clutch on the shaft B, and by means of these clutches the pulley C revolves the shaft B and operates the needle-bar.

F, Fig. 1, is a lever attached to the standard M by a stud at N. The end O of the lever spans a groove in the clutch D, and by this lever the clutch D is thrown in and out of the clutch E, thereby permitting the pulley C to revolve loosely on the shaft B, or when thereon in gripe with the clutch E to cause the shaft B to revolve with it.

S is a lever, horizontally attached to the under side of the table-top A A, and forming a compound lever with F, and operating it by means of a connection, G, to which the knob K is attached. The stem of the knob K passes through a short slot in the table-top, and by moving the knob K the levers S and F are operated and the clutches E and D thrown in and out of gripe or contact. There is a small notch in the side of the slot in the table-top, into which the stem of the knob fits when pushed one side to the right, and this holds the levers and clutches in place when the needle-bar is stopped, when by a touch of the finger on the knob K it is thrown out of the notch in the side of the slot, and permits the spring H to push the lever F and throw the clutches E and D in gripe.

I claim—

The clutch E and D, in combination with the pulley C, the eccentric-shaft B, the levers S and F, and the knob K, when constructed as described, for the purposes set forth.

THOMAS J. FORD.

Witnesses:
A. B. RICHMOND,
H. M. RICHMOND.